Figure 1:
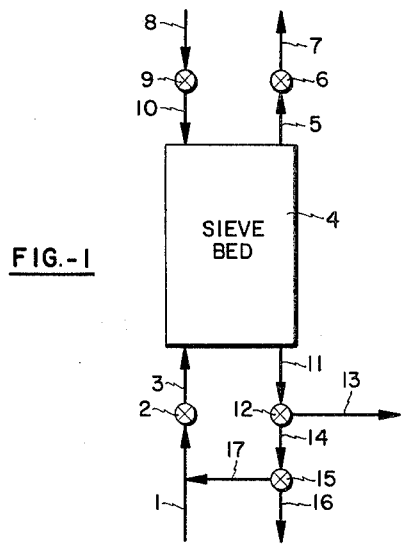

April 26, 1966 W. J. ASHER 3,248,322
CHROMATOGRAPHIC SEPARATION
Filed Sept. 12, 1962 3 Sheets-Sheet 1

WILLIAM J. ASHER  Inventor

By David L. Roth

Patent Attorney

April 26, 1966  W. J. ASHER  3,248,322
CHROMATOGRAPHIC SEPARATION
Filed Sept. 12, 1962  3 Sheets-Sheet 2

WILLIAM J. ASHER   Inventor

By David A. Roth

Patent Attorney

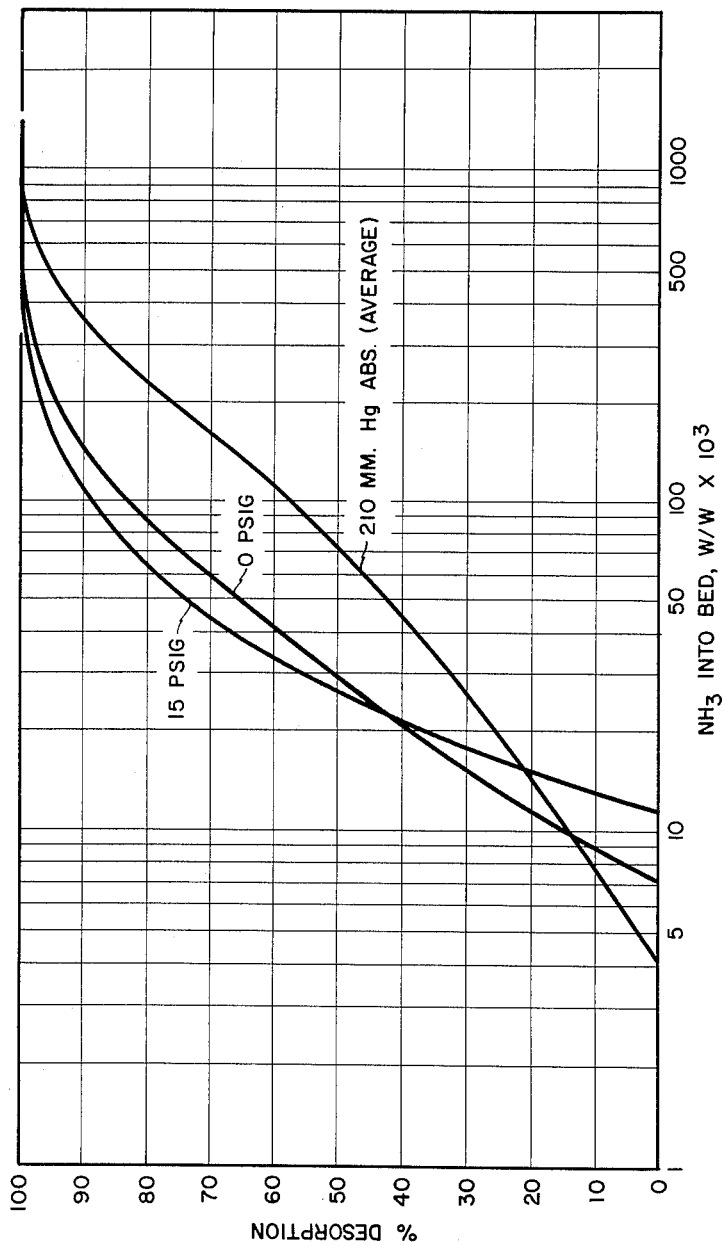

United States Patent Office 3,248,322
Patented Apr. 26, 1966

3,248,322
CHROMATOGRAPHIC SEPARATION
William J. Asher, Cranford, N.J., assignor to Esso Research and Engineering Company, a corporation of Delaware
Filed Sept. 12, 1962, Ser. No. 223,032
17 Claims. (Cl. 208—310)

The present invention relates to a process for separating and segregating straight chained hydrocarbons from mixtures thereof with other materials such as branch chained and/or cyclic or aromatic hydrocarbons. More particularly, the present invention relates to the adsorption of straight chain, normal hydrocarbons from isomeric branch chained, aromatic and cyclic compounds employing a class of natural and/or synthetic zeolitic adsorbents termed, because of their crystalline structure, molecular sieves. Still more particularly, the present invention relates to an improved process whereby the yield and purity of normal hydrocarbons is much improved over techniques previously known.

In brief the process of the invention involves passing feed containing n-paraffins, i.e., usually at least 1, e.g., 30 vol. percent paraffins based on total feed, through a molecular sieve whereby the n-paraffins are selectively adsorbed on the sieve. The sieve is then desorbed to obtain the desired n-paraffins. Some impurities come off with the n-paraffin desorbate but these impurities are unexpectedly concentrated in the first portion of the desorbate. Thus the first portion of desorbate contains almost all the impurities and it can be recycled or discarded. The second portion of desorbate contains the subsantially pure n-paraffins. These portions of desorbate are referred to for convenience as first desorbate and second desorbate.

It has been known for some time that certain zeolites, both naturally occurring and synthetic, have the property of separating normal from isomeric branch chained hydrocarbons, as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 Angstrom units to 8 to 15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen and an alkali and/or alkaline earth element, e.g. sodium and/or calcium, magnesium, etc. Analcite has the emperical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e., the ability to adsorb a straight-chain hydrocarbon and exclude the branch chain isomers, are described in an article, "Molecular Sieve Action of Solids," appearing in Quarterly Reviews, vol. III, pp. 293 to 330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important to industry. Thus, in the preparation of jet and diesel fuels, the presence of normal paraffins degrades the freezing point rating. On the other hand, in the manufacture of synthetic detergents such as alkyl aryl sulfonates, a straight chain nuclear alkyl substituent makes for better detergency and biodegradable characteristics than a branch chained substituent of the same number of carbon atoms. Numerous other examples can be cited.

Though it has in the past been proposed to make these separations, i.e., of normal from isomeric hydrocarbons and aromatics by molecular sieves, and though selective separations have been realized, serious problems have arisen when it was attempted to separate petroleum stocks containing normal hydrocarbons and recover high purity n-paraffins.

In addition to the desired adsorption of n-paraffins in the molecular sieve crystals, undesired adsorption of other feed components (cyclo, iso-paraffins and aromatics) occurs on the surface of the crystals and in the binder that holds the crystals together in the extrudate particles of the commercial synthetic zeolites. Upon desorption in a conventional manner, the undesired components are desorbed with the desired n-paraffins lowering the purity of the desorbed product. It has been found that by carrying out the adsorption step at a low absolute pressure, e.g. 0.25 to 3.0 p.s.i.a. at temperatures of 550–650° C. in the $C_6$–$C_{26}$ range, the amount of undesired adsorption is reduced more than the desired adsorption of n-paraffins to yield a higher purity product.

There is an additional factor bearing upon the practical use of a low pressure adsorption step in a commercial cycle. That is, to make effective and sufficient use of a displacing medium as a desorbing agent, desorption should desirably take place at atmospheric pressure or above. (See FIGURE 6.) If subatmospheric pressures are to be used for adsorption to lower the amount of impurities in the product and atmospheric or greater pressures are to be used for greater displacing medium efficiencies in desorption, then necessarily any commercial process would require expensive equipment. Thus, a complete process would require four discrete steps. These are (1) adsorption at lower pressure, (2) pressure build-up to desorption pressure, (3) desorption, and (4) depressure back to adsorption pressure. The minimum equipment necessary to carry out the process with four steps in which displacing agent would be reused would include a large and expensive vacuum pump or compressor to depressure the bed for adsorption and to maintain the resulting vacuum during adsorption.

Methods other than adsorption under lower absolute pressure to improve the purity of the desorbed n-paraffin have been discovered and they form major features of this invention. One of these methods stems from the most unusual and unexpected discovery that there is a chromatographic effect present during the desorption of normal paraffins and impurities from a molecular sieve. By chromatographic effect it is meant that some adsorbed materials on a sieve are eluted or desorbed preferentially as regards other adsorbed materials.

In brief, the discovery involves the fact that impurities such as aromatics, isoparaffins, cycloparaffins and some other impurities which are usually nonselectively adsorbed on the binder and on the crystal surfaces of sieves have a lower residence time on a molecular sieve bed than normal paraffins, and, therefore, will be desorbed first in the desorption step. Knowing this, it is possible to easily segregate the impurities from normal paraffins because there is an actual chromatographic effect in the desorption step. In operation the first 1 to 90 preferably 5 to 50 and most preferably 10 to 30 wt. percent of desorbate is either recycled or discarded.

The existence of such a chromatographic effect is significant since it is now not so important to control the adsorption conditions at low absolute pressures to prevent adsorbing a relatively high degree of impurities along with the normal paraffins. The only practical upper limitation on the partial pressure of feed is that it should be below the pressure which would cause gross condensation in the bed. Therefore, with respect to control of impurities, adsorption can be now carried out at feed partial pressures 10 or more times the low partial pressure required to obtain purity without using this effect without undue concern about adsorbed impurities since they can be conveniently separated in the desorption step.

A processing scheme taking particular commercial advantage of this effect is described below. It is possible (in many cases) to add displacing with the feed so that the total of the allowable partial pressure of the feed and partial pressure of the displacing agent is about atmospheric pressure. The adsorption is run in the 400–800° F. range with this input. Subsequent desorption is conducted at essentially the same pressure and the first portion of the desorbate separated from the final pure n-paraffin. With this constant pressure operation, no compressor or vacuum pump is required to compress the displacing agent from the pressure of adsorption to the pressure used for desorption. The advantages of the instant invention are clear and quite significant. They could result as a practical matter in saving 25–30% in plant investment.

The fact that there is a distinct chromatographic effect during desorption is completely unexpected since the expectation would be that non-normals would be adsorbed at least as strongly as normal paraffins and some likely even more strongly. Thus the polarizability of cyclo-, iso- and normal paraffins is about the same. Therefore, they all would be expected to desorb in the same proportions regardless of the amount of displacing agent used. The polarizability of the aromatics is even greater than that of n-paraffins. It follows that it would be expected that even more displacing medium would be needed to displace aromatics as compared to n-paraffins. The phenomenon cannot be explained on the basis of a rate limitation of the desorption of n-paraffins. This is true since if the rate of ingoing displacing agent is increased the rate of desorption of n-paraffins is also increased. This indicates that this desorption phenomenon is equilibrium controlled. See Example II and FIGURE 4.

The invention can be fully understood by referring to both the preceding and following descriptions, the claims taken in conjunction therewith and by the accompanying drawings wherein: FIGURE 1 is a schematic diagram of a process suitable for carrying out a preferred embodiment of the inventive technique. FIGURES 2–5 are graphs illustrating various concepts which will be developed later herein.

The invention can be most simply illustrated by referring to FIGURE 1. In FIGURE 1 a hydrocarbon feed containing n-paraffins is flowed through line 1, valve 2, and line 3 to sieve bed 4. The feed flows through sieve bed 4 which selectively adsorbs n-paraffins. Sievate flows out of bed 4 through line 5, valve 6 and line 7 where it can be stored or discarded. In the desorption step a displacing agent, e.g., $NH_3$ is flowed through line 8, valve 9 and line 10 through sieve bed 4. Desorbate flows out of sieve bed 4, through line 11 and to valve 12. Valve 12 is operated in such a manner that desorbate is flowed through either line 13 to storage or through line 14 for recycle or discard. According to the invention the first part of the desorbate is an empirically determined amount depending on the desired purity e.g. about the first 25 wt. percent of the desorbate based on total desorbate for each cycle. Then the first 25 wt. percent of the desorbate is flowed through valve 12, line 14 to valve 15 where with the proper valve positioning it can be discarded through line 16 or recycled through line 17.

In this embodiment the adsorption is carried out in the range of 200–900° F., preferably 400–800° F., and most preferably 500–800° F. vapor phase with the feed partial pressure low enough to prevent gross condensation in the bed. The feed partial pressure being in the range of 0.001–0.9, preferably 0.01–0.7, and most preferably 0.05–0.2 of the pressure that would condense a hydrocarbon having a boiling point equal to the average boiling point of the feed at the temperature of operation. The feed contains n-paraffins in the range of $C_4$–$C_{80}$, preferably $C_6$–$C_{50}$, and most preferably $C_8$–$C_{25}$ in total concentrations of 0.2 to 90, preferably 1–50, most preferably 5–30 wt. percent range. Displacing agent may be added with the feed, but this is not necessary. Desorption is conducted at temperatures 200–900° F., preferably 400–800° F., and most preferably 500–800° F. and pressures of 0.2–200 p.s.i.a., preferably 0.5–50 p.s.i.a., and most preferably 4–30 p.s.i.a. with sufficient displacing agent to displace a substantial portion of the n-paraffin adsorbed.

Another effect has been discovered that can be used to increase the purity of the desorbed n-paraffins from a molecular sieve. This forms a major feature of this invention. At the end of the adsorption step after the feed into the bed has been stopped, displacing agent is put into the bed with all of the outlet valves closed. The pressure is allowed to build up to 101–500%, preferably 110–200, and most preferably, 110–130% of the adsorption pressure. Then the bed is depressured back toward and perhaps below the pressure of adsorption. It is discovered that the material coming out of the bed during this depressure contains a major portion of the impurities adsorbed on the bed. The relatively pure material on the bed is then desorbed. Displacing agent can be added with the feed during the adsorption but this is not necessary. It is found that putting additional displacing agent in the bed during the depressure step increases the removal of impurities. In fact, it is found that the removal of impurities with this technique is superior to the simple combination of the depressure technique followed by passing displacing agent over the bed to obtain the chromatographic effect.

While the invention has been so far described using ammonia for a preferred displacing medium, the invention is not intended to be so limited. By displacing medium is meant a polar material or a material with substantial polarizability compared to normal paraffin. It is intended that the terms "displacing medium" and "displacing agent" have the same meaning. In summary, the essence of the instant invention is the finding that the desorbate which contains the impurities can be controlled by making sure that the first portion of desorbate is either discarded or recycled to feed. The particular displacing agent used is not of great importance and is picked as a matter of convenience. The portion of desorbate retained as being a substantially pure normal paraffin is usually about the last 30 to 90%.

A preferred displacing medium has the general formula

wherein $R_1$, $R_2$ and $R_3$ are selected from the group consisting of hydrogen and $C_1$ to $C_5$ alkyl radicals. Thus the desorbing material includes $NH_3$ and $C_1$ to $C_{15}$ primary, secondary, and tertiary amines with $NH_3$ being most preferred and the $C_1$ to $C_5$ primary amines being next in order of preference. Other suitable desorbing mediums include $SO_2$, $NH_3$, $C_1$ to $C_5$ alcohols, glycols, halogenated compounds such as methyl and ethyl chloride and methyl fluoride, nitrated compounds such as nitro methane and carbon dioxide. Generally, any compound that has at least one polar bond, or a polarizability substantial compared to the material to be desorbed can enter the molecular sieve, has a heat of adsorption that is substantial compared to the material to be desorbed and is preferentially adsorbed under the desorption conditions described herein can be used as a displacing agent.

The invention will be further illustrated by the following examples.

*Example I*

A feed consisting of a $C_9$ to $C_{18}$ virgin distillate which is made up of two distillates, i.e., 65% by vol. obtained from a Hassi Messavod crude and 35% by vol. obtained from an Agha Jari crude was subjected to an adsorption-desorption cycle under a technique similar to that described above in connection with FIGURE 1.

The cycle consisting of adsorption and desorption was operated at atmospheric pressure, that is, about 15–20 p.s.i.a. and a temperature of 625–665° F. The adsorption was at a feed rate of 0.6 to 1.2 w./w./hr. with 1 mole of ammonia per mole of feed. The ammonia was included in order to make sure that the feed was completely vaporized at adsorption conditions.

Desorption was with ammonia at about 0.18 weight of ammonia per weight of absorbent per hour. The adsorbent was a Linde 5 A. sieve consisting of $\frac{1}{16}$ inch extrudates in a 5' sieve bed. A sharp chromatographic separation was effected. The initial desorbate contained about 60% impurities. This level then dropped sharply to about 37% impurity. Using a 30% by volume based on total desorbate recycle of desorbate to feed, a product purity of almost 97% was obtained with a net sieve capacity of 3 weights per hundred per weight cycle. The time of the total cycle using a sieve capacity of 3 weights per 100 weights is about 22 to 44 minutes. The results of this example are summarized in FIGURES 2 and 3 of the drawing.

Figure 2:
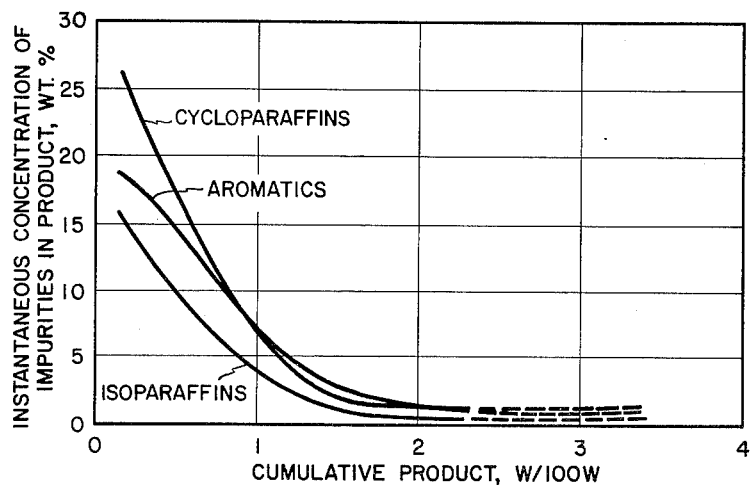

FIGURE 2 is a graph of instantaneous concentration of impurities in product versus the total cumulative product in weights per 100 weight. As can be readily appreciated from the graph, the concentration of impurities is extremely high in the first weight per 100 weight of cumulative product and between 1 and 2 weight per 100 weight of product the concentration of impurities levels off.

Figure 3:
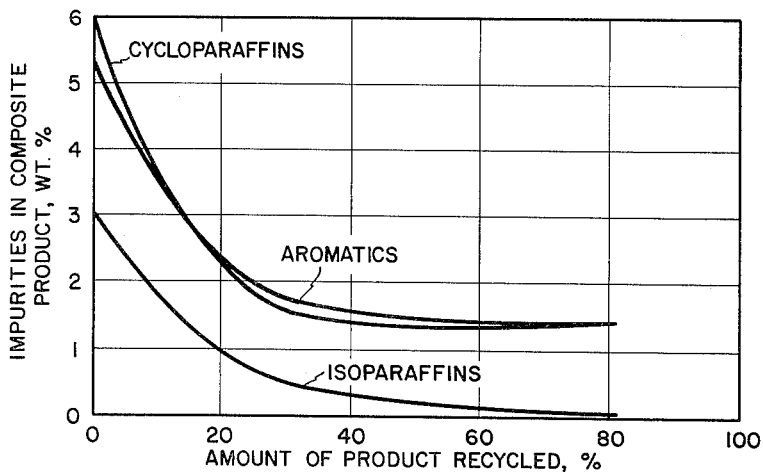

FIGURE 3 is a plot of impurities in composite product versus amount of product recycled. It is apparent that when 25% or less product is recycled there is an appreciable improvement with respect to diminishing the amount of impurity in the composite product. This effect seems to level off at about 25% of product recycled and, therefore, for this particular example there is no particular advantage to be gained in recycling beyond about 25 or 30%. Other types of feed with differing compositions will have varying cut points which will provide the optimum recycle quantities. These cut points will be apparent to one skilled in the art who has the benefit of this disclosure.

*Example II*

Figure 4:
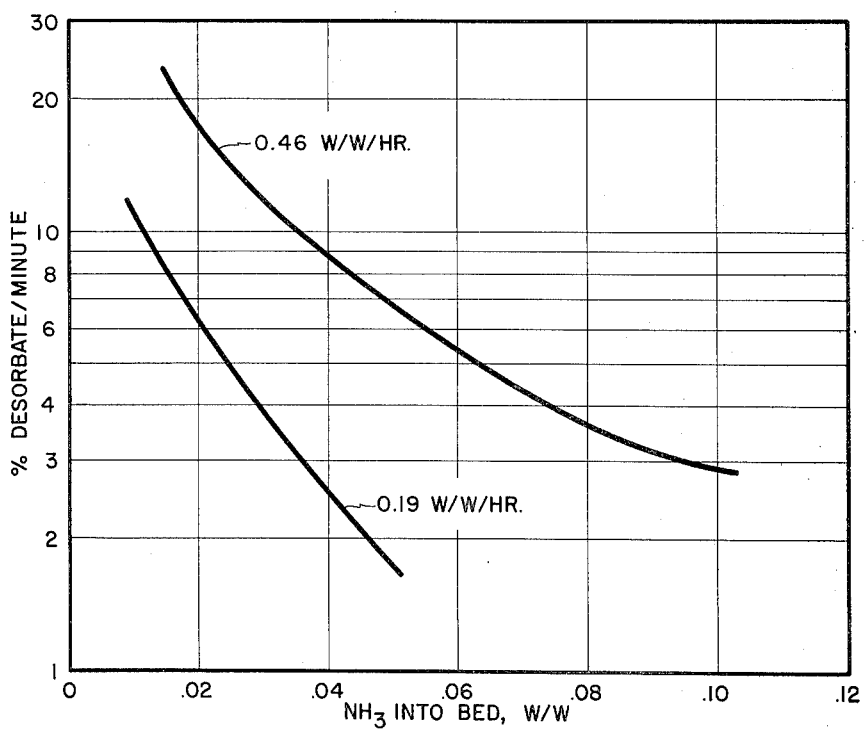

FIGURE 4 which is based on actual data is a graph which demonstrates that as the displacing agent rate is increased the n-paraffin rate out is increased. Thus increased $NH_3$ rate results in a commensurate n-paraffin rate out. The graph of FIGURE 5 is percent desorbate/minute versus w./w. of $NH_3$ going in the sieve. The sieve is a 5 A. Linde molecular sieve. The temperature was 625 to 665° F. and the pressure was about atmospheric. The feed was the same as that used in Example I. This bears out the thesis that this particular desorption effect is equilibrium controlled.

*Example III*

The feed of Example I was used in several adsorption-desorption sequences on a 5 A. molecular sieve at 600° F. The adsorption pressures were about 200 mm. Hg absolute. The desorption pressures were 15 p.s.i.g., 0 p.s.i.g., 220 mm. Hg absolute, and 200 mm. Hg absolute. The results are shown in the graph of FIGURE 5 where wt. percent desorption is plotted vs. $NH_3$ in, expressed as w./w. times $10^3$. It can be clearly seen from the graph that as the desorption pressures are increased from subatmospheric pressures progressively less displacing agent is required. Thus, higher pressures favor more efficient operations with respect to quantities of displacing agent necessary.

Although the invention has been described with a certain degree of particularity, it will be understood that numerous changes in details of the basic inventive technique can be resorted to without departing from the spirit and scope of the invention as hereinafter claimed.

What is claimed is:

1. In the process of obtaining normal paraffins in the range of $C_8$ to $C_{21}$ in admixture with branched chain and cyclic hydrocarbons in a feed containing 1 to 30% normal paraffins which comprises adsorbing said normal paraffins on a 5 A. molecular sieve and desorbing said normal paraffins with an ammonia displacing agent, the improvement which comprises separating a first desorbate consisting of 2 to 70% of total desorbate by weight out of the total desorbate and collecting as product only the second desorbate, and wherein said adsorption is carried out at a temperature of 550 to 750° F., a feed rate of .5 to 1.5 w./w./hr., with 0.5 to 2.0 moles of $NH_3$ per mole of this feed at a pressure in the range of 10 to 25 p.s.i.a. for a time of 5 to 200 minutes, and wherein said desorption is carried out with an $NH_3$ displacing agent at a feed rate of .2 to 1.0 w./w./hr., a temperature of 550 to 800° F., a pressure of 10 to 25 p.s.i.a. and for a time of 5 to 50 minutes separating enough of the first desorbate to recover a desorbate containing a greater percentage of normal paraffins than would have been obtained in the total desorbate.

2. In the process of obtaining normal paraffins as desorbate by adsorbing normal paraffins from admixture with branched chain and cyclic hydrocarbons onto a molecular 5 A. sieve and recovering said normal paraffins by desorbing said normal paraffins from said molecular sieve by means of a polar displacing agent, the improvement which comprises the separation of the first 1 to 70 volume percent of desorbate from the normal paraffin product.

3. A process according to claim 2 wherein said displacing agent has the general formula

wherein $R_1$ is selected from the group consisting of hydrogen and $C_1$ to $C_5$ normal alkyl radicals.

4. A process according to claim 3 wherein said displacing agent is ammonia.

5. A process according to claim 2 wherein said adsorption is carried out at temperatures of 200° to 900° F.

6. A process according to claim 5 wherein the feed rate of adsoprtion is 0.5 to 1.5 w./w./hr. for a time of 5 to 200 minutes and the desorption rate is 0.2 to 1.0 w./w./hr. for a time of 5 to 200 minutes.

7. A process according to claim 2 wherein said first desorbate is discarded.

8. A process according to claim 2 wherein said first desorbate is recycled to feed.

9. A process according to claim 2 wherein said displacing agent is also present in the feed in proportions of 0.1 to 20.0 moles of displacing agent per mole of feed.

10. A process of obtaining normal paraffins from an impurity containing feed, said feed comprising a mixture of normal paraffins, branched chain hydrocarbons and cyclic hydrocarbons; the said feed containing from 1 to 70% normal paraffins which comprises in combination adsorbing said normal paraffins on a 5 A. molecular sieve on an adsorption zone, sealing said adsorption zone, building up the pressure within said adsorption zone to a pressure 10 to 500% greater than the pressure of adsorption with a displacing agent and depressurizing said zone by unsealing and allowing a portion of the initial adsorbed material to desorb and be removed from said bed, allowing a portion of the displacing agent to be removed from said bed, introducing displacing agent into said bed to desorb the remaining adsorbed material, segregating the total desorbed material into two portions, a first portion relatively rich in impurities and a second portion depleted in said impurities.

11. A process according to claim 10 wherein said feed contains displacing agent.

12. A process according to claim 10 wherein from 0 to 70% of said total desorbed materials are recycled to feed.

13. A process according to claim 10 wherein from 0 to 30% of said total desorbed materials are recycled to feed.

14. A process according to claim 10 wherein additional displacing agent is added to said zone while said zone is being depressured.

15. A process according to claim 10 wherein said displacing agent is a polar displacing agent.

16. A process according to claim 10 wherein said displacing agent is a nonhydrocarbon polar displacing agent.

17. A process according to claim 10 wherein said displacing agent is $NH_3$.

References Cited by the Examiner
UNITED STATES PATENTS

| | | | |
|---|---|---|---|
| 2,966,451 | 12/1960 | Caesar et al. | 260—676 |
| 3,070,542 | 12/1962 | Asher et al. | 260—676 |
| 3,083,245 | 3/1963 | Lindahl et al. | 260—676 |

ALPHONSO D. SULLIVAN, *Primary Examiner.*